(12) United States Patent
Read et al.

(10) Patent No.: US 8,224,752 B2
(45) Date of Patent: Jul. 17, 2012

(54) DIGITAL RIGHTS MANAGEMENT LICENSE RENEWAL

(75) Inventors: Christopher J. Read, San Diego, CA (US); Robert Hardacker, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 946 days.

(21) Appl. No.: 11/591,342

(22) Filed: Nov. 1, 2006

(65) Prior Publication Data
US 2008/0103976 A1    May 1, 2008

(51) Int. Cl.
*G06F 21/00* (2006.01)
(52) U.S. Cl. ......................................... 705/59
(58) Field of Classification Search ............ 705/59
See application file for complete search history.

(56) References Cited

U.S. PATENT DOCUMENTS

| | | |
|---|---|---|
| 2002/0161996 A1 | 10/2002 | Koved et al. .................. 713/150 |
| 2002/0196940 A1 | 12/2002 | Isaacson et al. .............. 380/227 |
| 2002/0196941 A1 | 12/2002 | Isaacson et al. .............. 380/231 |
| 2002/0198841 A1 | 12/2002 | Isaacson et al. ................ 705/51 |
| 2004/0010602 A1 | 1/2004 | Van Vleck et al. ............ 709/229 |
| 2005/0204019 A1 | 9/2005 | Flynn et al. ................... 709/219 |
| 2005/0268346 A1* | 12/2005 | Lee et al. ......................... 726/27 |
| 2007/0044159 A1* | 2/2007 | Ishiguro .......................... 726/27 |

\* cited by examiner

*Primary Examiner* — Pierre E Elisca
(74) *Attorney, Agent, or Firm* — Stuart H. Mayer, Esq.; Karin L. Williams, Esq.; Mayer & Williams PC

(57) ABSTRACT

A method of playing back content based on digital rights management (DRM) between a portable storage and a device and a portable storage for the same are provided. The method of playing back content using a portable storage includes requesting the portable storage to transmit a right to play back content protected through digital rights management (DRM), receiving the right to play back the content protected through DRM from the portable storage, and informing the portable storage of completion of the playback when a playback of the content protected through DRM using the right is completed.

37 Claims, 9 Drawing Sheets

DIGITAL RIGHTS MANAGEMENT LICENSE RENEWAL

BACKGROUND

Digital rights management ("DRM") is seeing more widespread use to control access, use and distribution of digital media content such as software, music, video (e.g., television, music videos and movies) and other digital data. One of the reasons DRM was developed is that digital media content, unlike traditional analog media content, has the potential to be copied over and over without any loss of quality in subsequent copies. In addition, the costs to copy digital media content and distribute it over networks such as the Internet are very small compared with the cost to create the content.

DRM typically enforces some restrictions on the duration of time or number of times a media file may be played on a device, or may limit the number of devices that may be used for playback. Some DRM methodologies, such as those currently used with digital versatile disc ("DVD") limit use of the media content to playback only, without authorization or enablement for copies to be made. DRM is also being used with some media content on compact disc ("CD") as well. Whatever particular rights or limits are provided, DRM generally enables digital media content providers to protect and manage their investments in creating the content. Such protection and management is often viewed as being reasonably necessary to ensure that a wide variety of high quality media content continues to be available to consumers.

The U.S. Digital Millennium Copyright Act of 1998 made it illegal to circumvent DRM and other methods used to protect the copyright of media content. Other countries have since adopted similar provisions under the requirements of an international treaty sponsored by the World Intellectual Property Organization. Recent court decisions have also confirmed that unauthorized sharing or downloading of proprietary media content using peer-to-peer file-sharing software violates the content provider's rights in protecting its creations. Thus, DRM has developed a solid legal footing in addition to its support from digital content creators and providers.

Consumers have generally accepted DRM and continue to purchase digital media content, such as music downloaded from Internet stores, that include DRM use restrictions. However, consumer reaction is more favorable and DRM techniques less apt to be purposefully circumvented when DRM restrictions are perceived as being fair and unobtrusive. That is, consumers appear to be more willing to accept DRM and are less likely to illegally acquire or share digital media content when legal use is simple and straightforward and meets the consumer's expectations of fairness. Thus, a goal for many DRM techniques is to make the implementation of DRM as transparent to the user as possible so that legal use of the media content is simply enabled with little or no awareness by the consumer that DRM is present or being implemented.

SUMMARY

An arrangement is provided where a DRM license associated with media content on a device, such as a portable media player, is renewed automatically when the device is operatively coupled (i.e., docked) to a DRM license server or media server such as a jukebox. A DRM paradigm is implemented in which custody of the media content (whether it is purchased or rented on a physical medium such as a DVD or CD, or legally acquired from an on-line service) is presumptive validation of the holder's continued right to use the media content on the jukebox and make copies for transfer and use on the portable media player.

In an illustrative example, the jukebox maintains an inventory list of cached DRM licenses associated with the media content that is held in custody. The DRM license sets limits on the use of the associated media content that is transferred from the jukebox to the portable media player. Such limits include, for example, the transfer of copies of the media content to a limited number of players, the transfer of only reduced quality or lower resolution versions to the player, and restrictions on subsequent transfer of copies of the media content from the player to other devices. Limitations on playback of the media content by the player (where the limits are set by time or by the number of times the player is able to play the media content) are also imposed.

When the DRM license on the player expires (for example, as a result of the time or play count limit being exceeded), the DRM license is renewed when the player is docked to the jukebox, but only so long as the jukebox continues to maintain custody of the media content. The renewed DRM license enables the player to use the media content again. Accordingly, the media content only needs to be transferred from the jukebox to the player once, but the DRM license on the player may be renewed on multiple occasions over time.

When media content is sold, transferred, or otherwise removed from the jukebox then the DRM license associated with the sold, transferred or removed media content is deleted from the inventory list of cached DRM licenses. Thus, the deleted DRM license is therefore unavailable to renew the DRM license on the player.

While many existing DRM schemes work very well, the present arrangement strikes an advantageous balance between protecting content creators' rights and investment and providing with consumers with an easy way to use DRM-protected media content. As the present DRM paradigm relies on custody of media content as an enabler of usage rights, the expectations of consumers—who traditionally equate possession of an object with the right to use it—are better satisfied. In addition, it is anticipated that consumers will be more willing to accept the present DRM license paradigm because it operates transparently and makes DRM license renewal easy and convenient.

DETAILED DESCRIPTION

Figure 1:
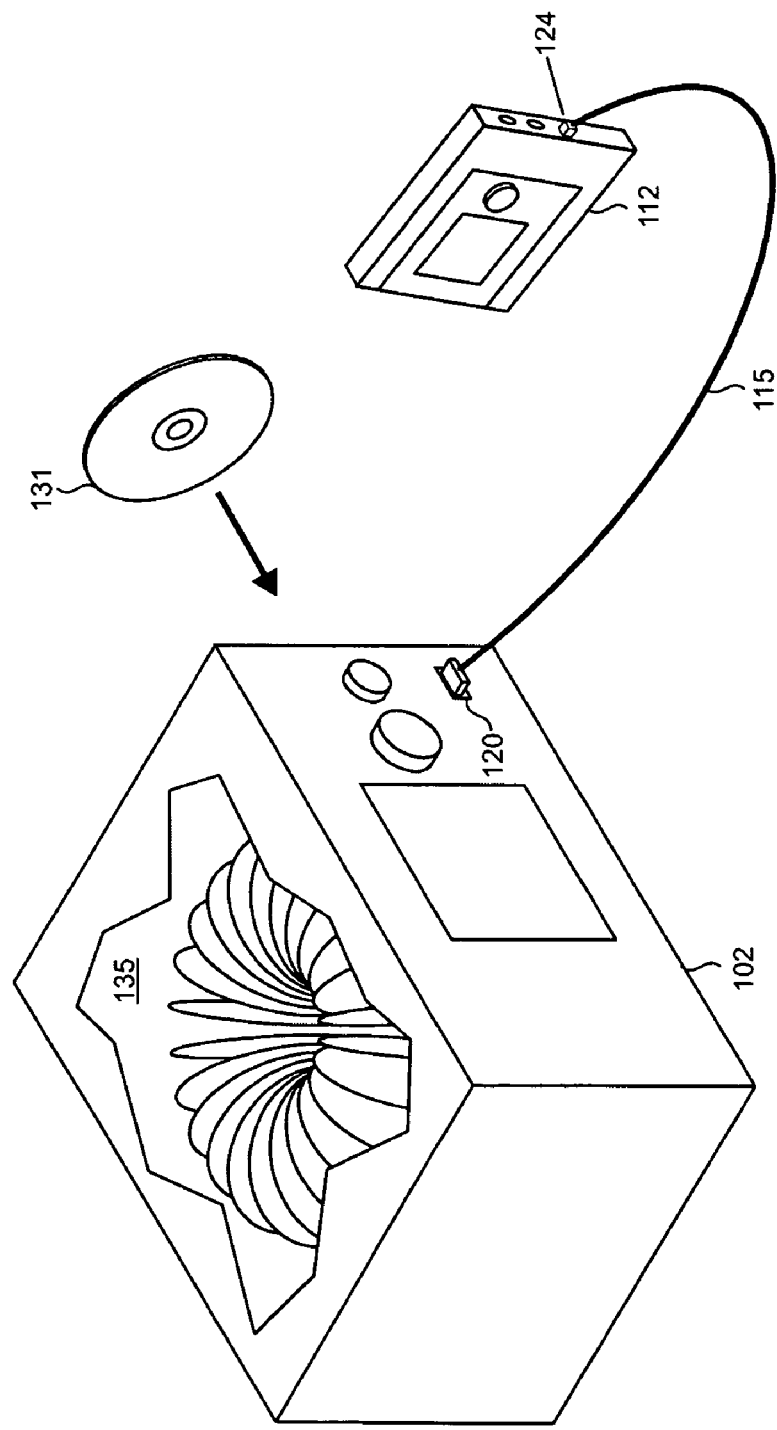
FIG. 1 is a pictorial view of an illustrative DRM license renewal arrangement showing a jukebox that is coupled to a portable media player where the jukebox has custody of media content on a plurality of optical discs.

FIG. 1 is a pictorial view of an illustrative DRM license renewal arrangement showing a jukebox 102 that is coupled to a portable media player 112 with a communications cable 115. Cable 115, in this illustrative example, is a USB (universal serial bus) cable that is coupled between respective USB ports 120 and 124 in the jukebox 102 and portable media player 112. In other applications of DRM license renewal, other cable types and associated communication protocols may be used including serial, IEEE-1394 (Institute of Electrical and Electronic Engineers) or "FireWire", parallel, small computer system interface (SCSI) and the like. USB ports 120 and 124 are typically arranged as high speed communications ports in conformance with the USB 2.0 Specification.

The jukebox 102 has custody of media content 131. Media content 131 is shown in FIG. 1 as stored using an optical disc storage medium such as a CD or DVD. Alternative optical storage formats include HD-DVD, Blu-Ray, hybrid DVD, Enhanced Versatile Disc, and optical holographic disc. In this illustrative example media content 131 is held in a carousel arrangement 135 as shown in cutaway view in FIG. 1. The carousel arrangement 135 includes a number of other optical discs. However, any of a variety of different storage formats, holding arrangements, and number of discrete media is also usable depending on the requirements of a specific application.

Jukebox 102 is configured to recognize and keep track of the identities of all media content 131 that is held in its custody in carousel arrangement 135. Custody of media content is a fundamental principle which underlies the DRM licensing paradigm which grants rights to the holder of the media content. That is, under the paradigm, custody of media content is required to enable usage rights according to the DRM licenses that accompany the media content. Without custody, no rights under the DRM licenses are provided.

Portable media player 112 is typically arranged to have features selected from the wide variety of devices that are available which are capable of receiving media content, typically in digital form, and play or otherwise use the media content under the direction of a user. Portable media player 112 is generally light and compact and operates on batteries (which are either replaceable or rechargeable in most cases). Depending on the requirements of an application, portable media player 112 may incorporate the features provided, for example, by audio players, video players, pocket PCs (personal computers), mobile phones, smartphones, personal digital assistants (PDAs), handheld game consoles, laptop PCs, and other devices having similar features or functions.

Figure 2:
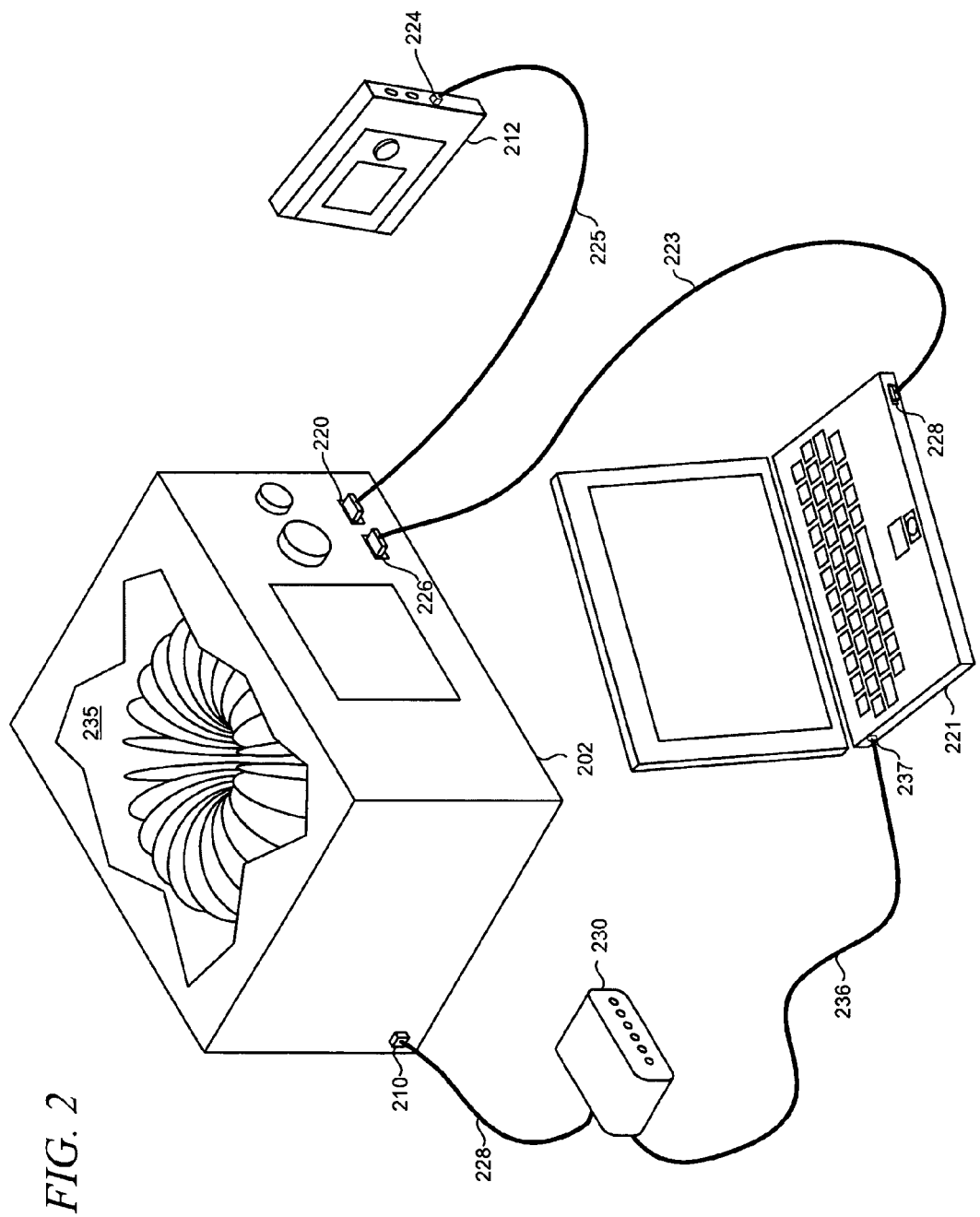
FIG. 2 is a pictorial view of an illustrative DRM license renewal arrangement showing a jukebox with a network port that is further coupled to a portable media player and personal computer.

FIG. 2 is a pictorial view of an illustrative DRM license renewal arrangement showing a jukebox 202 with a network port 210. Jukebox 202 is coupled to a portable media player 212 with a USB cable 225 coupling respective USB ports 220 and 224. Portable media player 212 is arranged with similar features and functions as player 112 in FIG. 1. Jukebox 202 holds custody of a number of optical discs containing media content. The optical discs are in a carousel arrangement 235, as shown.

Network port 210 is typically configured as a broadband or high bandwidth connection such as 10 or 100 MB Ethernet connection. Network port 210 is coupled with cable 228, for example an Ethernet-type cable, to a network gateway 230. Network gateway 230 may be arranged from a DSL (digital subscriber line) or cable modem, hub, switch or router, for example, to provide connectivity to an external network such as the Internet. Such external network is used, in some applications as described below, to browse, purchase and download media content. Jukebox 202 is configured to recognize and keep track of the identities of all media content that is downloaded and held in its custody.

As with the physical optical media example shown in FIG. 1 and described in the accompanying text, custody of downloaded media content is the basis for the enablement of rights under the present DRM license paradigm. The concept of physical custody is not readily applicable to downloaded digital media content. However, custody is still established for purposes of DRM license enablement when the downloaded media content is acquired in a manner that is consistent with the DRM license that is associated with it. In other words, if the downloaded media content is properly and legally acquired, then the jukebox 202 is considered to be in custody of such downloaded media content for purposes of the present DRM license paradigm.

Jukebox 202 is optionally coupled to a PC 221 which, in this illustrative example, is a laptop computer. A USB cable 223 is used to couple respective USB ports 226 and 228. As with the arrangement shown in FIG. 1, cables 223 and 225 are alternatively selected from other known cable types. PC 221 is further connected to network gateway 230 using cable 236 (e.g., an Ethernet-type cable), which is coupled to network port 237 on PC 221.

PC 221 is usable to facilitate the selection and downloading of online media content from a network to jukebox 202. In alternative arrangements, jukebox 202 is configured with sufficient resources to facilitate external network or Internet access directly, using for example, a keyboard or remote control device (not shown) to facilitate user input. A display may be incorporated in to the jukebox, or alternatively the jukebox is arranged with facilities to drive an external display such as a monitor.

Figure 3:
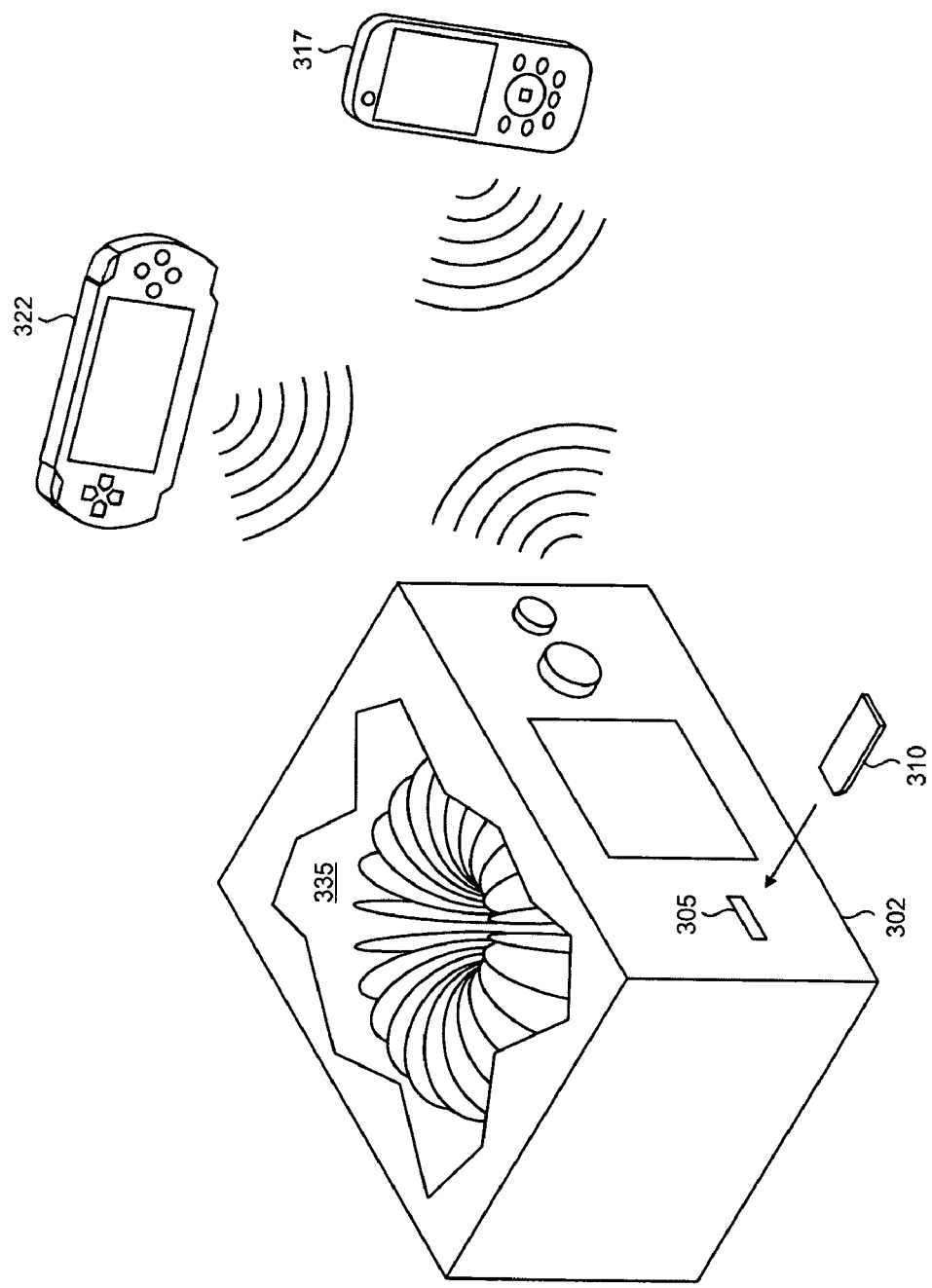
FIG. 3 is a pictorial view of an illustrative DRM license renewal arrangement showing a jukebox with a media port, removable media, and two portable media devices in wireless communication with the jukebox.

FIG. 3 is a pictorial view of an illustrative DRM license renewal arrangement showing a jukebox 302 with a media port 305, removable media 310 in operative relationship therewith, and two portable media devices 317 and 322 in wireless communication with the jukebox 302. Jukebox 302 holds custody of a number of optical discs containing media content. The optical discs are in a carousel arrangement 335, as shown.

Removable media 310 is typically selected from one or more of the variety of currently available flash memory cards such as Memory Stick, CompactFlash and SD (Secure Digital). Such flash memory cards are small but are capable of storing large amounts of digital media content, often in the multiple gigabyte range. Removable media 310 is used, in some applications as described below, as an alternative storage and distribution form to the optical media content shown in FIG. 1 or the downloaded media content shown in FIG. 2. Jukebox 302 is configured to recognize and keep track of the identities of all media content stored on removable media 310 that is held in its custody.

Media port 305 in jukebox 302 is arranged to receive removable media 310 and enable the media content contained therein to be read by and transferred to jukebox 302. Jukebox 302 is further equipped with a wireless transceiver which is arranged to provide a communications path with other wireless devices. In this illustrative example, jukebox 302 uses a Wi-Fi communications protocol conforming to IEEE 802.11x (Institute of Electronic and Electrical Engineers). Alternative communication protocols include Bluetooth, ZigBee, and wireless USB, for example.

Portable device 317 is configured with mobile phone functionality and is another example of a device that may be used with the present DRM license renewal arrangement. Portable device 317, equipped with audio and/or video and image processing capability, exemplifies the current generation of mobile phones which can play music, display video clips and show pictures in addition to providing regular mobile telephone functions to the user.

Portable device 322 is configured as a portable game console and is another example of a device that is usable with the present DRM license renewal arrangement. Portable device 322 is capable of playing music and video files as a supplement to its game playing functionality.

Figure 4:
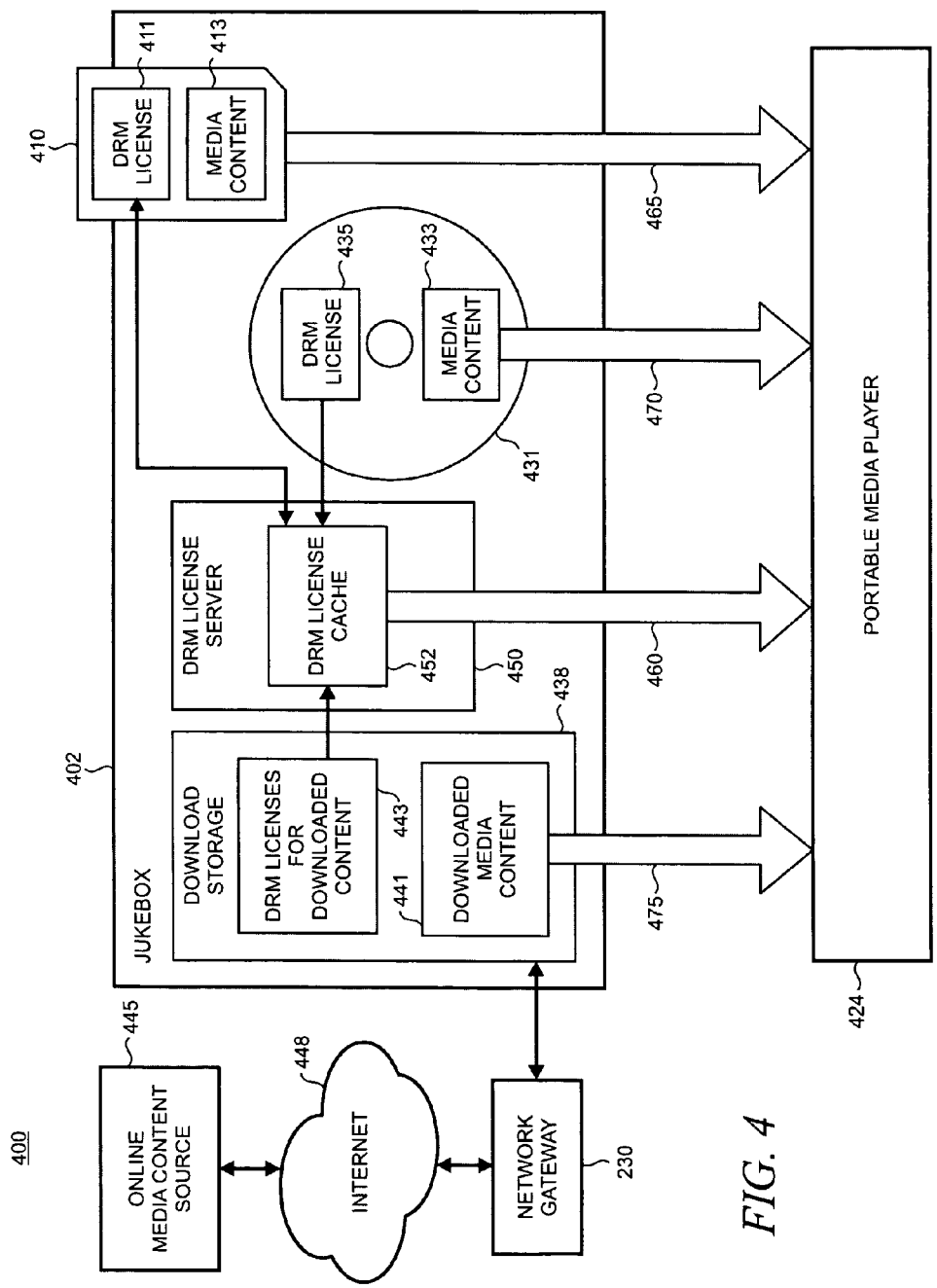
FIG. 4 is a functional block diagram of an illustrative DRM license renewal arrangement.

FIG. 4 is a functional block diagram of an illustrative DRM license renewal arrangement 400. A jukebox 402, in this illustrative example, has custody of media content in the form of removable media 410, optical disc 431, and stored downloaded media content 438.

Removable media 410 includes media content 413 and an associated DRM license 411. DRM license 411 sets the rights and limits for use of the media content 413. Optical disc 431 likewise includes media content 433 and associated DRM license 435.

Stored downloaded media content 438 includes the downloaded media content 441 and the DRM license 443 that is associated with the downloaded media content that sets rights and usage limits. As described above, for the stored downloaded media content 438 to be in proper custody of the jukebox 402 it must be legally downloaded (i.e., received in accordance with its associated DRM license) from an online media content source 445. Online media source 445 is accessed by jukebox 402 on line 449 through the network gateway 230 and Internet 448, as shown in FIG. 4.

An alternative media source 450 is also coupled to the jukebox 402 via portable device 325 (which, as described above, is configured with mobile phone functionality in this example). Portable device 325 is arranged to browse, select and then download media content and associated DRM licenses from the alternative media source 450 over a wireless communication network 451 such as a mobile phone network or wireless data network. In addition to devices that include mobile phone functionality, portable device 325 may be arranged in various alternative implementations as a personal computer, laptop computer, personal digital assistant, smartphone, portable game player, portable media player, portable video player, portable music player, portable entertainment system, car-based audio system, car-based video system, car-based entertainment system, or combinations thereof. Typically, all the alternatively implemented devices are equipped with a network interface to thereby access media content sources such as alternative media source 450 as shown in FIG. 4. In addition, other types of electronic devices are contemplated as being usable to access remote media content including personal devices having integrated communications capability that are small and light enough to be conveniently carried on the person of a user.

Portable device 325 is typically arranged to then transfer the downloaded media content and associated DRM licenses to jukebox 402 over line 452 in FIG. 4 which represents a wired connection such as that provided by a USB (Universal Serial Bus) cable, or alternatively a wireless connection such as that conforming with the Bluetooth wireless communication protocol. In an alternative arrangements, remote access point can be used to transfer the media content that is downloaded using the portable device 325. For example, in the case of car-based portable devices an access point located in a garage or parking area (not shown) is coupled to the jukebox 402 or to a local area network to which the jukebox 402 is coupled. The access point conveniently allows the downloaded media content on the car-based portable device to be transferred to the jukebox 402 when the car is parked in the garage or parking area.

The transferred downloaded media content and associated DRM licenses are stored in download storage 438. Thus, portable device 325 functions as a proxy device that acts as an intermediary between the alternative media content source 450 and jukebox 402.

In some applications of DRM license renewal, the portable device 325 retains a copy of the downloaded media content and associated DRM licenses. The downloaded content retained by the portable device 325 may be arranged with the original quality, or be configured as a "lossy" version that has reduced quality (e.g., lower audio sampling rate, video resolution etc.). Similarly, the retained DRM license may impose limits on the retained downloaded media content to thereby impose limits or restrictions on use of the retained downloaded media content as described below.

Jukebox 402 includes a DRM license server 453 which is arranged with a DRM license cache 455. DRM license cache 455 is arranged from non-volatile, or alternatively, protected memory, and functions to receive and cache the DRM licenses from the removable media 410, optical disc 431 and stored downloaded media content 438. DRM license cache 455 advantageously enables DRM licenses to be quickly renewed onto a portable media player.

Figure 9:
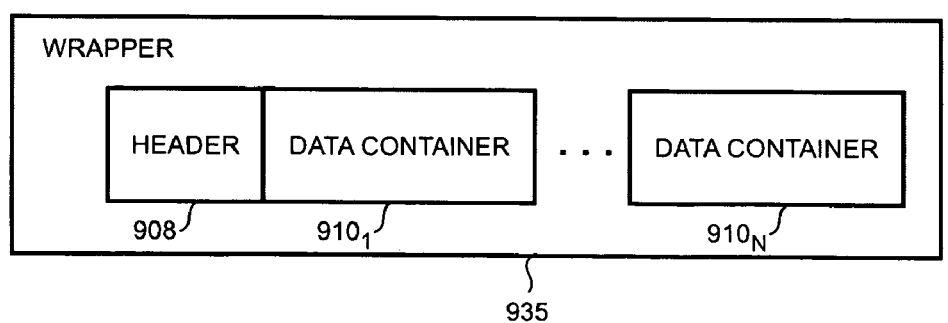
FIG. 9 is a diagram of an illustrative structure for a digital media file.

It is noted that the DRM license and associated media content stored on the removable media 410, optical disc 431 and stored downloaded media content 438 may be stored as portions of the same discrete file. Such configuration is shown in FIG. 9 and described in the accompanying text. Alternatively, the DRM license and associated media content are storable as different discrete files on the storage media, depending on the requirements of a specific application. For example, it may be desirable to more tightly bind the DRM license to the media content as achieved using a common file structure. In other settings, separating the DRM license and media content into separate discrete files can improve DRM license transfer utility through a caching arrangement, for example, as discussed below. Although stored as separate discrete files in this case, typically the files for the DRM license and associated media content are linked, using for example, pointers in each file.

The DRM license server 453 transfers and renews DRM licenses to a portable media player 424 as indicated by arrow 460 when the portable media player 424 is operatively connected to jukebox 402. Media content 413, 433 and 441 are also transferable from jukebox 402 to portable media player 424 in accordance with the terms of the respective associated DRM licenses as indicated by arrows 465, 470 and 475, as shown in FIG. 4. As noted above, in some applications such transfer is implemented through the transfer of a reduced quality or lower resolution copy of the media content. Portable media player 424, in this illustrative example, is selectable to include functionalities from any of the portable devices described above or shown in FIGS. 1 to 3.

Portable device 325 (i.e., a mobile phone) may also be used, in some applications, as a substitute for portable device 424. In such an arrangement, portable device 325 both functions as an alternative media content source for jukebox 402 and as a recipient of transferred media content and associated DRM licenses from jukebox 402.

Figure 5:
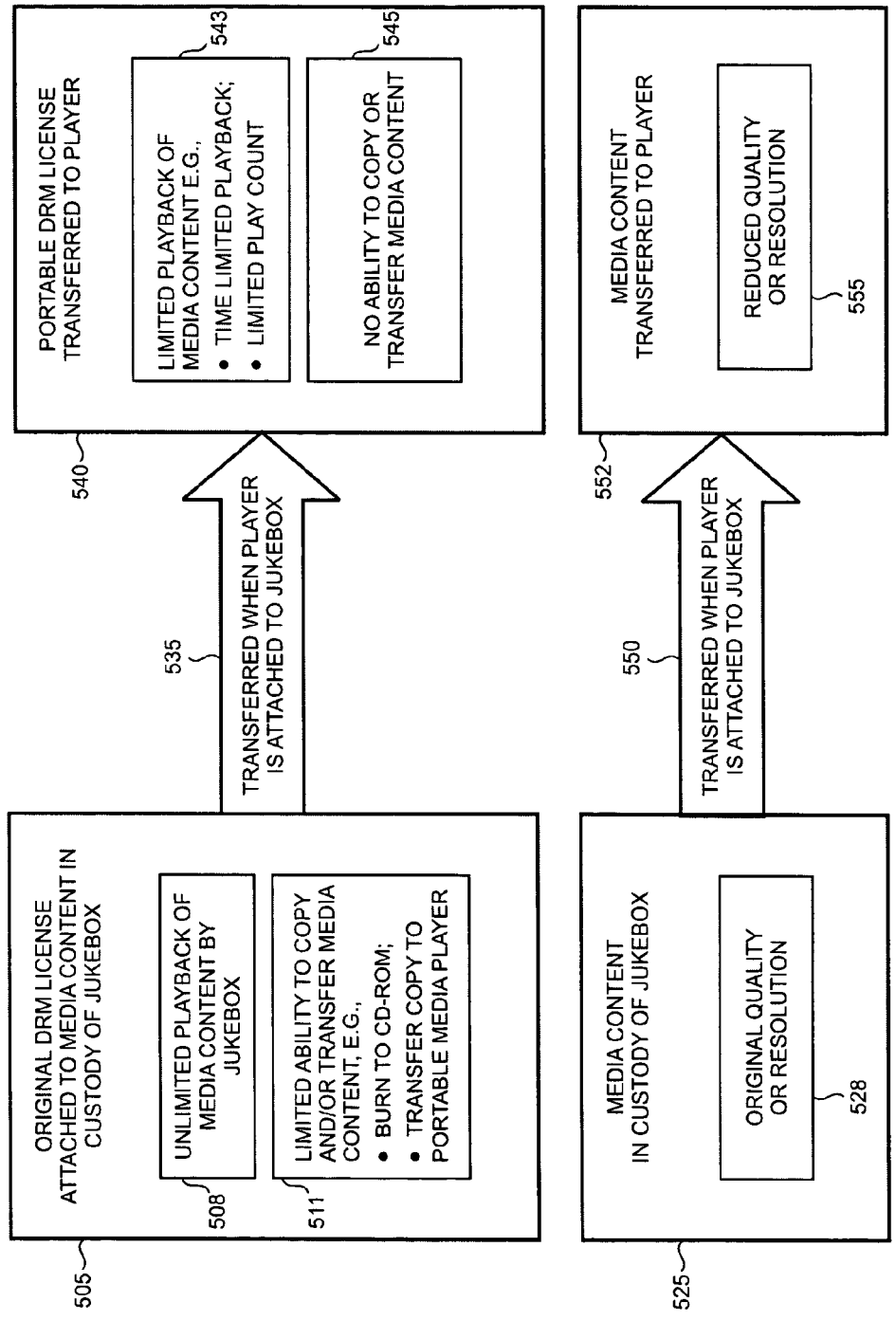
FIG. 5 is a diagram showing details of the transfer of DRM licenses and media content from a jukebox to a portable media player.

FIG. 5 is a diagram showing details of the transfer of DRM licenses and media content from the jukebox 402 (FIG. 4) to portable media player 424 (FIG. 4). A DRM license associated with media content in custody of jukebox 402 (designated as the "original" DRM license to distinguish it from a corresponding DRM license on the portable media player) is indicated by reference numeral 505 in FIG. 5. In an illustrative example, the original DRM license 505 sets rights and limits for the associated media content 525. Such rights typically include unlimited playback of the media content by jukebox 402 held in its custody, as indicated by block 508. The playback quality of media content 525 on jukebox 402, as set by DRM license 505, is at an original level of quality or resolution as shown by block 528.

As indicated by block 511, the DRM license 505 sets limits on transfer and copy of media content 525. In this illustrative example, copies of the media may be transferred (i.e., "burned") onto a CD-ROM (compact disc read only memory) and only reduced resolution copies may be transferred to portable devices. In various alternative examples, such transfers may be limited by the number of CD-ROMs that may be burned, the number of portable devices that may receive a lower-resolution copy, or by restricting the ability for the portable media player to transfer the media content to other portable devices (i.e., restrictions on subsequent copying).

Arrow 535 indicates that a DRM license is transferred from the jukebox 402 to create a DRM license on the portable media player 424. As discussed in more detail below, the DRM license is generally transferred to the portable media player 424 when the player is operatively connected to jukebox 402. The transferred DRM license (designated as the "portable" DRM license to distinguish it from the corresponding original DRM license on the jukebox) is associated with media content that is transferred to the portable media player 424 and is indicated by reference numeral 540 in FIG. 5.

In an illustrative example, the portable DRM license 540 sets rights and limits for the associated media content 552. Such rights typically include limited playback of the media content held in custody of the jukebox 402 as indicated by block 543. The playback quality of media content 552 on portable media player 424 as set by portable DRM license 540 is at reduced level of quality or resolution as shown by block 555.

The limitations of playback include, for example, time limited playback, limited play count and restrictions on the number of portable devices that may use the media content 552 at the same time. That is, the portable DRM license 540 can specify start times, end times, and license duration limits for the media content 552. In addition, the portable DRM license 540 may be set to support counted operations on the portable media player 424 which specifies the number of time that the media content 552 can be played back by the portable media player 424. The present DRM licensing may also be arranged so that only a limited number of portable devices may use the media at the same time. For example, it may be desirable in some applications for only a single portable device at a time be permitted to use the transferred media content 552.

As indicated by block 545, the portable DRM license 540, in this illustrative example, restricts the subsequent transfer of media content 552 and/or the portable DRM license 540 from the portable media player 424 to another portable device. In alternative arrangements, the media content 552 is subsequently transferable, but the portable DRM license 540 is not. In such an alternative arrangement, a new and different portable DRM license would need to be obtained by the other portable device to enable the subsequently transferred media content to be used.

Arrow 550 indicates that a copy of media content 525 is transferred to portable media player 424. As discussed above, the transferred media content 552 is typically copied at a reduced level of quality or resolution compared with the media content 525 held in custody by jukebox 402. For example, for a transferred audio file the audio sampling rate may be reduced. For a transferred video file, the pixel resolution and/or frame rate may be reduced. In alternative examples, media content 525 may be copied and transferred with no reduction in quality or resolution. Or, a full resolution version may be transferred where the portable media player is then configured to play the transferred media content at a reduced level of quality. The extent to which quality or resolution is maintained or lowered at transfer or playback is specified by the original DRM license 505 by itself or in combination with portable DRM license 540.

Figure 6:
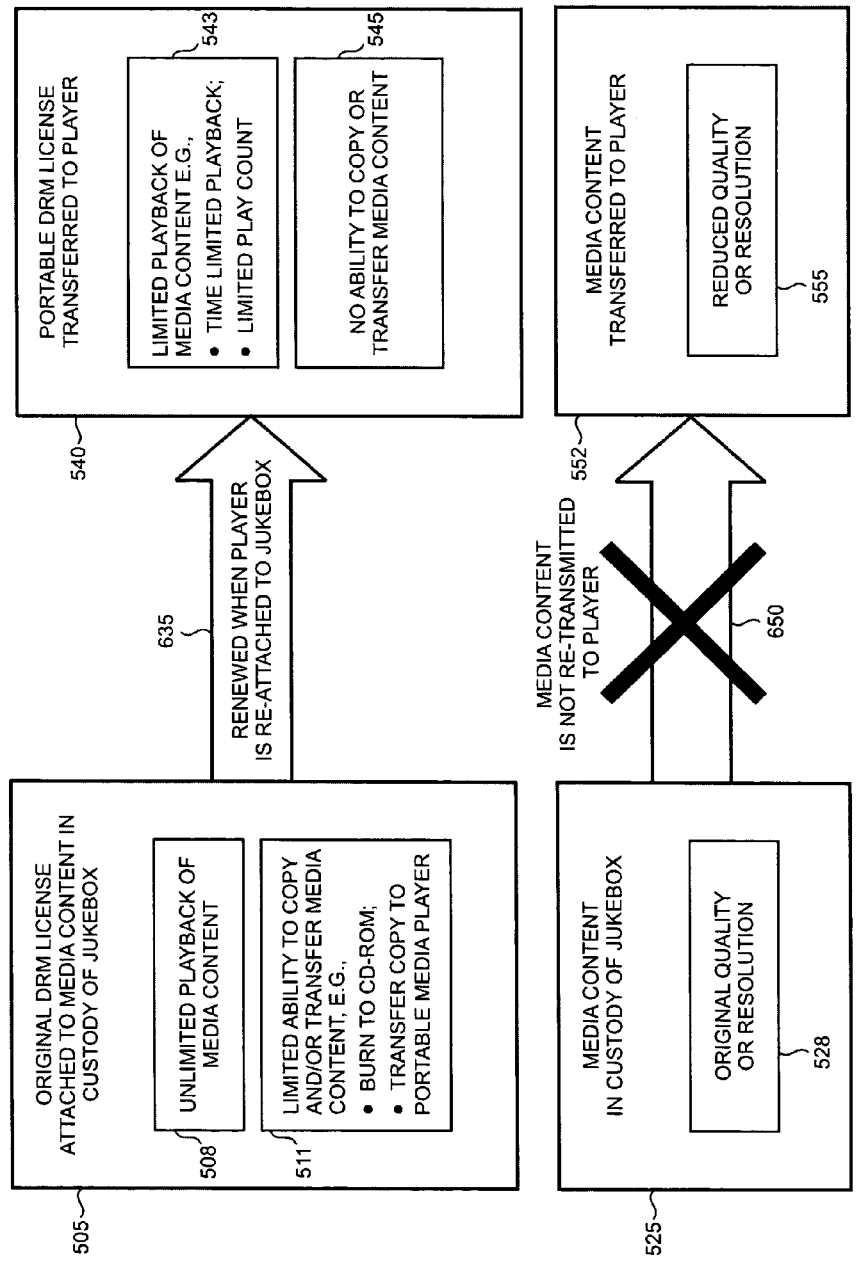
FIG. 6 is a diagram showing details of the renewal of DRM licenses from a jukebox to a portable media player without the retransfer of media content.

FIG. 6 is a diagram showing details of the renewal of DRM licenses from the jukebox 402 (FIG. 4) to portable media player 424 (FIG. 4) without the retransfer of media content. As indicated by arrow 635, original DRM license 505 is used to renew an expired portable DRM license 540 when the portable media player 424 is operatively coupled to the jukebox 402 so long as the jukebox 402 continues to maintain custody of the media content associated with the DRM license that is up for renewal. However, media content 525 does not need to be transferred again, as indicated by the crossed arrow 650. Once the portable DRM license 540 is renewed, the media content 552 is usable again in accordance with the terms of the portable DRM license 540.

Figure 7:
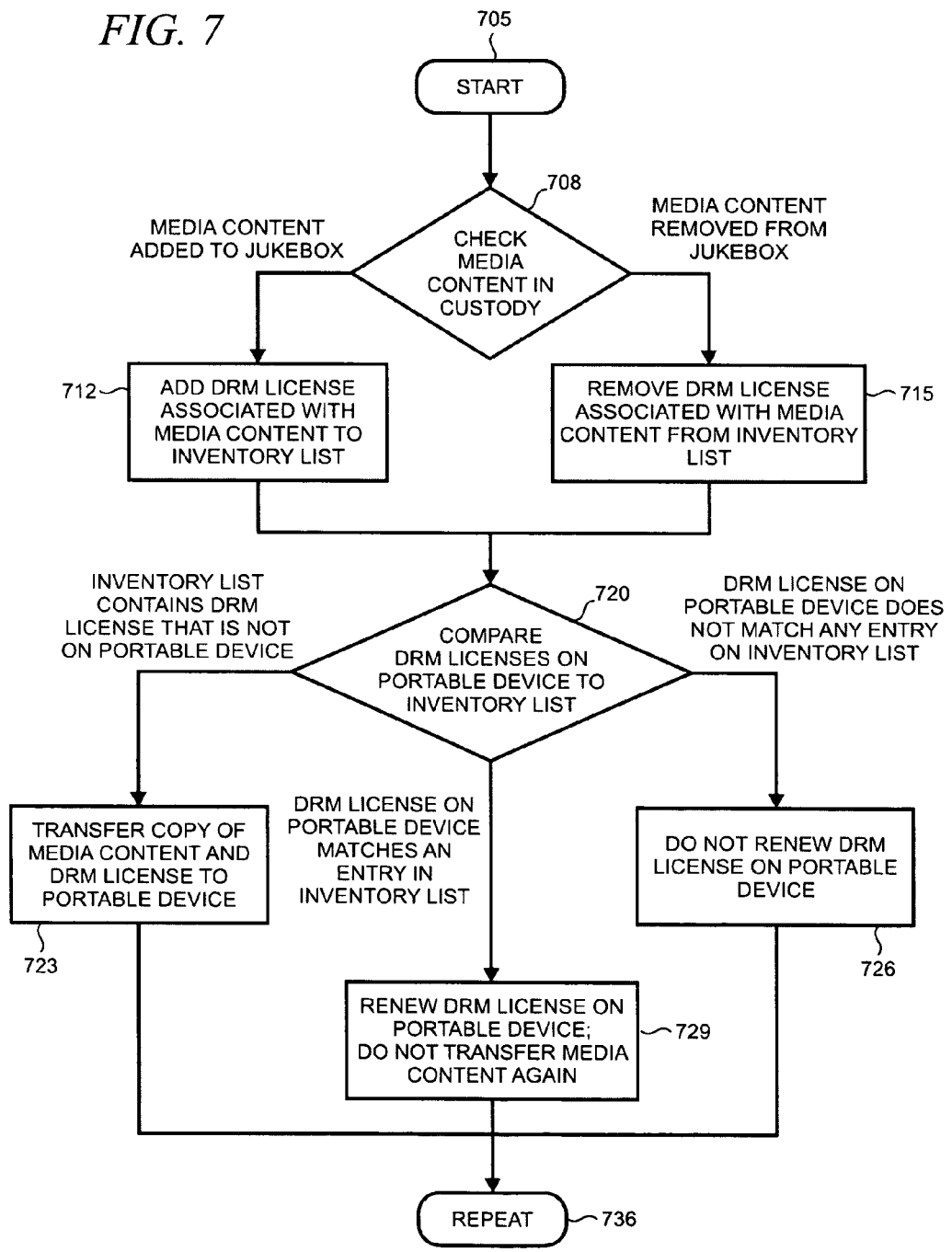
FIG. 7 is a flowchart of an illustrative method for renewing DRM licenses on a portable media player.

FIG. 7 is a flowchart of an illustrative method for renewing DRM licenses on a portable media player. The method starts at block 705. At decision block 708, an inventory of the identities of current media content held in custody of the jukebox 402 (FIG. 4) and their associated DRM licenses is maintained. On the left path from decision block 708, if media content, such as a new DVD or Memory Stick, is added by a user to the jukebox 402 (FIG. 4), then the DRM license associated with the newly added media content is added to a DRM license inventory list, as shown in block 712. Typically, the DRM license inventory list is maintained using the cached DRM licenses in cache 452 (FIG. 4). Alternatively, the DRM license inventory comprises DRM license identity information (for example, an ordered list containing entries to identify DRM licenses) that is stored separately or as part of memory which makes up cache 452.

On the right path from decision block 708, if media content is removed from the jukebox 402, then the DRM license associated with the removed media content is removed from the DRM license inventory list, as shown in block 715. In addition, in some applications, the DRM license associated with the removed media content is removed from DRM license cache 452 as well.

At decision block 720, when the portable media player 424 is operatively coupled to the jukebox 402, a comparison is made between portable DRM licenses and the original DRM licenses held in cache 452 or in the inventory list. Such operative coupling occurs whenever a user couples or docks the portable media player 424 to the jukebox 402. A user would normally perform such coupling, for example, when a newly purchased or rented music CD is inserted into the optical disc carousel (e.g., carousel 335 in FIG. 3) and the user wishes to copy the music to the portable media player 424.

If there are DRM licenses in the DRM license cache 452 or license inventory list that do not match the portable DRM licenses on the portable media player 424, then the left branch from decision block 720 is taken. This situation would occur, for example, when new media content, such as CD, with new associated DRM licenses is added to jukebox 402. At block 723, then, a lower resolution copy of the new media content in custody of the jukebox (e.g., media content 552 in FIG. 5) is transferred to the portable media player 424 and an associated portable DRM license (e.g., portable DRM license 540) is placed in the portable media player 424.

If there are DRM licenses on the portable media player 424 that do not match the DRM licenses in the DRM license cache 452 or license inventory list, then the right branch from decision block 720 is taken. This situation would occur, for example, when media content that was once held in the jukebox 402 is removed by a user from jukebox 402 (and is accordingly no longer held in the custody of jukebox 402 for purposes of DRM license renewal). At block 726, then, the portable DRM license 540 on the portable media player 424 associated with the removed media content is not renewed. In this situation, the portable DRM license 540 would eventually expire on its own (through expiration of the allowed time limit or playcount) and thus render the associated media content unplayable. Alternatively, the portable DRM license 540 associated with the media content removed from the jukebox 402 is affirmatively removed at the time the portable media player 424 is operatively coupled to jukebox 402.

If the portable DRM license 540 on portable media player 424 matches a current DRM license in the DRM license cache 452 or license inventory list, then the central branch is taken from decision block 720. This situation would occur when media content and an associated DRM license were previously transferred from media content held in custody by jukebox 402, and such media content is still held in custody when the portable media player 424 is subsequently docked again. At block 729, the portable DRM license 540 is renewed, however as shown in FIG. 6 and described in the accompanying text, the media content associated with the renewed DRM license does not need to be transferred again to the portable media player 424.

At block 736, the above described method is repeated for all the media content held on the portable media players. In addition, the method is repeated as media content is added and removed over time from jukebox 402 and the portable media player 424 is coupled and uncoupled from the jukebox 402. Optionally, when the portable media player 424 is re-coupled to the jukebox 402, all of the portable DRM licenses are sorted by expiration date and renewed in order of closest expiration date.

In most applications, the method shown in FIG. 7 is repeated continuously so that DRM license renewal is performed automatically and as a background operation that is transparent to the jukebox and portable media player user.

Figure 8:
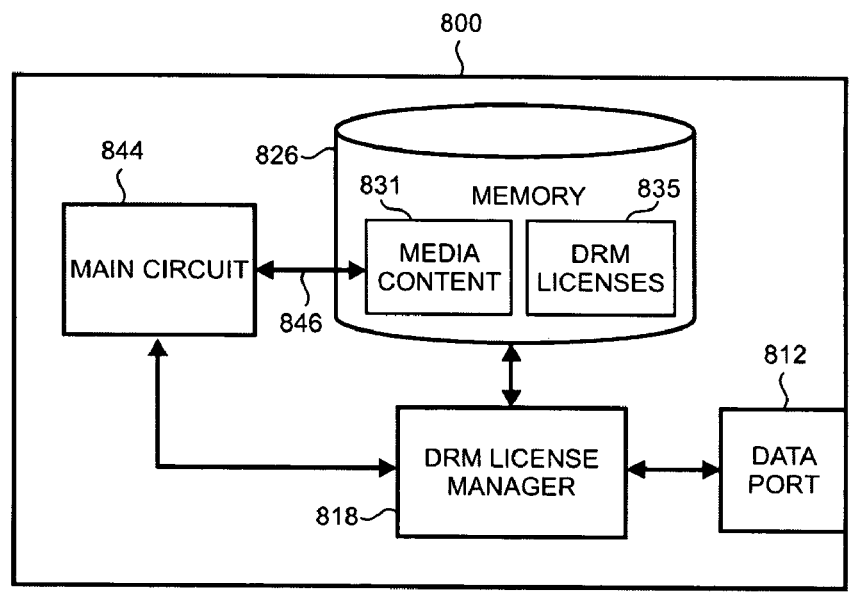
FIG. 8 is a functional block diagram of an illustrative portable media player.

FIG. 8 is a functional block diagram of an illustrative portable media player 800. Portable media player 800 may be configured to include the functionalities of any of the variety of player types described above and shown in FIGS. 1 to 3, depending on the specific requirements of the application. Portable media player 800 includes a data port 812 for receiving media content that is transferable from a jukebox, such as jukebox 402 in FIG. 4. Data port 812 in this illustrative example is a USB type port, but other port types, including both wired and wireless (e.g., wireless USB, IEEE 802.11, Bluetooth etc.) are alternatively usable.

Data port 812 is coupled to a DRM license manager 818 which manages the portable DRM licenses that are held by portable media player 800. DRM license manager 818 functions to implement the license rights and restriction contained in the portable DRM licenses against the associated media content. For example, DRM license manager 818 ensures that the portable media player will not play a transferred video clip or song if the DRM license associated with such video or song file has expired. As another example, DRM license manager 818 enables the portable media player to use media content (in accordance with the associated DRM license) upon initial transfer of the media content from the jukebox 402 or upon renewal of the portable DRM license.

DRM license manager 818, in an illustrative example, manages the storage of incoming media content (e.g., media content 552 in FIG. 5) and DRM licenses (e.g., portable DRM license 540) on a memory 826 which includes a media content storage area 831 and a portable DRM license storage area 835. DRM license manager 818 further functions to communicate with the jukebox 402 so that the comparison of DRM licenses held in the jukebox and portable media player may be implemented, as described in the text accompanying FIG. 7.

DRM license manager 818 is operatively coupled to the main circuit 844 of portable media player 800. Such operative coupling is implemented to ensure that the media content from media content storage area 831 is provided to the main circuit 844 (over line 846) for playback in accordance with an associated portable DRM license held in DRM license storage area 835.

FIG. 9 is a diagram of an illustrative structure 900 for a digital media file. Structure 900 is an example of a digital media file structure that is usable as downloadable (or otherwise electronically transferable) media content that implements the DRM license paradigm described herein.

Structure 900 includes a header 908, one or more data containers 910$_1$ . . . 910$_N$ and a wrapper 935. Header 908 precedes the data containers 910 and includes information, or metadata, such as descriptive data about the digital media file, transmission data (when the digital media file is delivered over a network), and other information that is generally characterized as overhead. Data containers 910 are used to hold data comprising the digital media which is generally compressed and packetized for security and/or file-size reduction purposes.

Wrapper 935, in this illustrative example, operates to contain compression and encryption information associated with DRM license functionality. That is, wrapper 935 enforces a DRM license management scheme where the data containers can only be accessed when the digital media file is transferred and used in accordance with a DRM license contained in wrapper 935. Such DRM license may be arranged in a similar manner to the original DRM license 505 shown in FIGS. 5 and 6 and described in the accompanying text.

Figure 10:
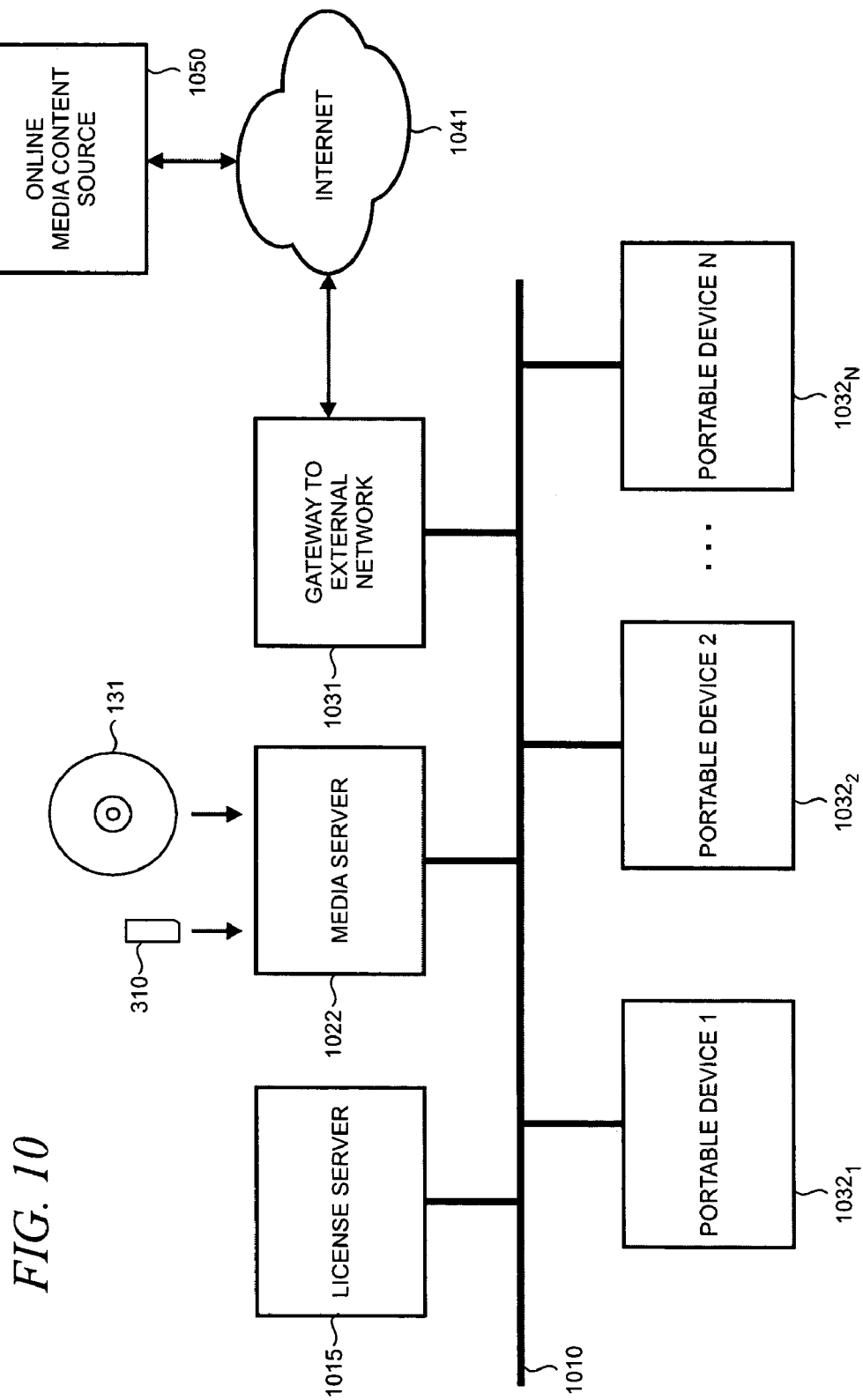
FIG. 10 is a diagram of an illustrative network to which a license server, media server, network gateway and one or more portable devices are coupled.

FIG. 10 is a diagram of an illustrative network 1010 to which a license server 1015, media server 1022, network gateway 1031 and one or more portable devices 1032$_1$, 1032$_2$ . . . 1032$_N$ are coupled. Network gateway 1031 is further coupled to a remote network (such as the Internet 1041 as shown in FIG. 10) so as to access an online media content source 1050 such as an electronic storefront to browse, purchase, and download DRM-protected media content such as songs, videos, games and the like.

Network 1010 is arranged, for example, as an Ethernet network that is located in a home or office. Network 1010 typically includes both wired Ethernet nodes and wireless Ethernet nodes. License server 1015 is configured to incorporate similar functionality as that provided by DRM license server 450 in jukebox 402 as shown in FIG. 4 and described in the accompanying text.

Media server 1022 is configured to hold custody of multiple media types including, for example, media content downloaded from online media content source 1050, optical disc 131 and removable media 310. Media server may be arranged in a similar manner as conventional media servers such as jukeboxes, multimedia PCs, and the like so long as the feature in which the media server can identify and keep track of the media held in custody is implemented. Although a single media server is shown in FIG. 10, multiple media servers are envisioned as being utilized in some larger home or office applications, particularly in situations where users having disparate preferences in media content share the network 1010.

Note that the license server function and media server function are distributed across two discrete devices unlike the integrated arrangement shown in FIGS. 1-4 and described in the accompanying text. Such distribution may be beneficial in some applications where DRM license management, caching, and serving can be centralized on the network 1010 for ease of administration, for example.

In operation, network 1010 enables portable devices 1032 to be conveniently coupled via a wired or wireless connection to media sources and the DRM license server 1015. Thus, the above described DRM license renewal paradigm is available even when portable media players and jukeboxes are located in physically diverse areas.

What has been described above includes illustrative examples of the digital rights management license renewal. It is, of course, not possible to describe every conceivable combination of components or methodologies, but one of ordinary skill in the art may recognize that many further combinations and permutations are possible. Accordingly, the illustrative examples are intended to embrace all such alterations, modifications, and variations that fall within the spirit and scope of the appended claims.

In particular and in regard to the various functions performed by the above described methods, components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrative examples. In this regard, it will also be recognized that the illustrative examples include a system as well as a computer-readable medium having computer-executable instructions for performing the acts and/or events of the various methods.

In addition, while a particular feature of the illustrative examples may have been disclosed with respect to only one of several implementations, such feature may be combined with one or more other features of the other implementations as may be desired and advantageous for any given or particular application or setting. Furthermore, to the extent that the terms "includes," and "including" and variants thereof are used in either the detailed description or the claims, these terms are intended to be inclusive in a manner similar to the term "comprising."

Other features of the invention are contained in the claims that follow.

What is claimed is:

1. A method for managing a DRM license for media content disposed on a portable media player, comprising the steps of:

maintaining a DRM license inventory on a DRM license server of DRM-licensed media content for which custody is held;

comparing the DRM license of the media content disposed on the portable media player against entries in the DRM license inventory; and renewing the DRM license based solely on if the comparing step yields a match between the DRM license and an entry in the DRM license inventory so as to enable use of the media content by the portable media player in accordance with the renewed DRM license.

2. The method of claim 1 in which the DRM-licensed content is stored on a physical medium selected from one of optical disc, magnetic media, semiconductor memory, Flash RAM, or magneto-optical disc.

3. The method of claim 1 in which the DRM-licensed content is downloaded over a network such as the Internet.

4. The method of claim 1 in which the DRM-licensed content is downloaded over a wireless data network using a portable device as a proxy device.

5. The method of claim 4 in which the portable device is selected from one of mobile phone, personal computer, laptop computer, personal digital assistant, smartphone, portable game player, portable media player, portable video player, portable music player, portable entertainment system, car-based audio system, car-based video system, car-based entertainment system, portable personal communication device, or combinations thereof.

6. The method of claim 4 in which the portable device transfers the downloaded DRM-licensed content to a storage device while retaining a copy of the downloaded DRM-licensed content.

7. The method of claim 6 in which the retained copy of the DRM-licensed content is subject to use restrictions selected from one of a limited time for playback, a limited playback count, or a limited number of portable devices that may simultaneously receive the DRM-licensed content.

8. The method of claim 1 in which the DRM license inventory is maintained as a cache implemented in memory selected from one of non-volatile memory or protected memory.

9. The method of claim 1 in which the enabled use includes playback of the media content by the portable media player for a limited time period.

10. The method of claim 1 in which the enabled use includes playback of the media content by the portable media player for a limited number of occasions.

11. The method of claim 1 in which the enabled use excludes distribution of copies of the media content from the portable media player.

12. The method of claim 1 in which the enabled use precludes use of the media content by more than one portable media player at a time or limits a number of distribution of copies of the media content from the portable media player.

13. The method of claim 1 further including a step of removing an entry from the DRM license inventory whereby the entry corresponds to DRM-licensed media content that is no longer in custody of the media server.

14. The method of claim 1 further including a step of preventing renewal of the DRM license for DRM-licensed media content for which custody is not held.

15. A portable media player, comprising:
- a data port connectable to a media server which has custody of DRM-licensed digital content for receiving a copy of the DRM-licensed digital content;
- a memory for storing a DRM license associated with the copy or the DRM-licensed digital content that is disposed in the portable media player whereby the DRM license controls the portable media player's use of the copy of the DRM-licensed digital content; and
- a DRM license manager arranged to receive a DRM license renewal when the portable media player is coupled to the media server via the data port whereby the DRM license is renewed based solely upon, and only if, the media server has custody of the DRM-licensed digital content.

16. The portable media player of claim 15 in which the DRM license renewal manager restricts playback of the copied digital content associated with an expired or non-renewed DRM license stored in the memory.

17. The portable media player of claim 15 in which the DRM license renewal manager restricts distribution of the copied digital content associated with an expired or non-renewed DRM license stored in the memory.

18. The portable media player of claim 15 in which the copy of the DRM-licensed digital content is copied from the DRM-licensed digital content at a reduced quality level.

19. The portable media player of claim 15 in which the copy of the DRM-licensed content is made using a lossy encoding methodology.

20. A structure for a digital media file, comprising:
- one or more data containers for storing media content;
- a header for storing metadata associated with the media content; and
- a wrapper containing a DRM license whereby
  a) the DRM license allows the digital media file to be copied from a media server to a portable media player based solely upon, and only when the media server is in compliant custody of the digital media file in which acquisition and use of the digital media files is compliant with an access and use policy included in the DRM license,
  b) portions of the DRM license are transferable to the portable media player as a portable DRM license whereby expiration of the portable DRM license prohibits use of the digital media file by the portable media player, and
  c) the portable DRM license is renewable so long as the media server is in compliant custody of the digital media file.

21. The structure of claim 20 in which the DRM license expires after an end time specified in the DRM license.

22. The structure of claim 20 in which the DRM license expires after a time duration specified in the DRM license.

23. The structure of claim 20 in which the DRM license expires once a play count specified in the DRM license is exceeded.

24. The structure of claim 20 in which the wrapper is utilized for encryption of the digital media file.

25. The structure of claim 24 in which the encryption is performed using a public key cryptographic technique.

26. The structure of claim 20 in which the one or more data containers, header and wrapper are arranged so that the digital media file is downloadable over a network.

27. A license server for renewing a device DRM license disposed in a device, comprising:
- a communication network port for communicating with communication network having one or more client nodes;
- a cache for caching an original DRM license having an association with media content held in custody by a media server; and
- a license server manager arranged to renew the device DRM license on the device from the original DRM license in the cache when the device is coupled to a client node on the communications network, whereby the device DRM license is renewed based solely upon, and only if, the license server manager confirms that the media content is held in custody by the media server.

28. The license server of claim 27 in which the license server is substantially incorporated within the media server.

29. The license server of claim 27 in which the media server is coupled to a client node of the communications network.

30. The license server of claim 27 in which the license server manager is arranged to renew the DRM license automatically when the device is coupled to the client node to thereby establish operative communication between the license server and the device over the communication network.

31. A digital storage medium arranged to be readable by a media server, comprising:
- a content storage area for storing media content protected by one or more DRM licenses;
- a DRM license storage area for storing original DRM licenses associated with the DRM-protected media content, and
- an original DRM license that is transferable to a portable media player as a portable DRM license, the original DRM license allowing renewal of the portable DRM license when expired based solely upon, and only so long as, the digital storage medium is in custody of the media server, whereby the portable DRM license must be unexpired for the media content to be playable by the portable media player.

32. The digital storage medium of claim 31 in which the content storage area and DRM license storage area are implemented using one of optical storage, magnetic storage, semiconductor memory, Flash RAM, or magneto-optical storage.

33. The digital storage medium of claim 31 in which the digital storage cilium is a DVD.

34. The digital storage medium of claim 31 in which the digital storage medium is a CD.

35. The digital storage medium of claim 31 in which the original DRM license specifics that media content is transferable to the portable media player as a lower resolution version.

36. The digital storage medium of claim 31 in which the DRM license storage area and the content storage area are arranged to share the same discrete file structure.

37. The digital storage medium of claim 31 in which the DRM license storage area and the content storage area are arranged as separate discrete files structures.

* * * * *

UNITED STATES PATENT AND TRADEMARK OFFICE
CERTIFICATE OF CORRECTION

PATENT NO.       : 8,224,752 B2
APPLICATION NO.  : 11/591342
DATED            : July 17, 2012
INVENTOR(S)      : Christopher J. Read et al.

Page 1 of 1

It is certified that error appears in the above-identified patent and that said Letters Patent is hereby corrected as shown below:

Claim 33, col. 14, line 48, after "storage" change "cilium" to --medium--.
Claim 35, col. 14, line 52, after "license" change "specifics" to --specifies--.

Signed and Sealed this
Eleventh Day of September, 2012

David J. Kappos
*Director of the United States Patent and Trademark Office*